(12) United States Patent
Bohacek et al.

(10) Patent No.: US 8,223,776 B2
(45) Date of Patent: Jul. 17, 2012

(54) INTERACTION OF VOIP CALLS AND CELLULAR NETWORKS

(75) Inventors: Peter Bohacek, La Honda, CA (US); David Sanders, Plano, TX (US)

(73) Assignee: Advent IP LLC, Brooklyn, NY (US)

(*) Notice: Subject to any disclaimer, the term of this patent is extended or adjusted under 35 U.S.C. 154(b) by 1512 days.

(21) Appl. No.: 11/285,805

(22) Filed: Nov. 22, 2005

(65) Prior Publication Data

US 2009/0180422 A1 Jul. 16, 2009

Related U.S. Application Data

(63) Continuation of application No. 09/653,680, filed on Sep. 1, 2000, now Pat. No. 6,982,985.

(60) Provisional application No. 60/152,039, filed on Sep. 2, 1999.

(51) Int. Cl.
*H04L 12/56* (2006.01)

(52) U.S. Cl. ........... 370/401; 455/432.1; 455/445; 709/244; 709/249

(58) Field of Classification Search ........... 370/352, 370/392, 338, 410
See application file for complete search history.

(56) References Cited

U.S. PATENT DOCUMENTS

| | | | |
|---|---|---|---|
| 5,581,596 A * | 12/1996 | Hogan | 455/435.1 |
| 5,793,762 A * | 8/1998 | Penners et al. | 370/389 |
| 6,014,377 A * | 1/2000 | Gillespie | 370/351 |
| 6,128,304 A * | 10/2000 | Gardell et al. | 370/401 |
| 6,240,449 B1 * | 5/2001 | Nadeau | 709/223 |
| 6,259,782 B1 * | 7/2001 | Gallant | 379/211.01 |
| 6,314,284 B1 * | 11/2001 | Patel et al. | 455/417 |
| 6,504,839 B2 * | 1/2003 | Valentine et al. | 370/354 |
| 6,519,242 B1 * | 2/2003 | Emery et al. | 370/338 |
| 6,535,596 B1 * | 3/2003 | Frey et al. | 379/201.01 |
| 6,542,497 B1 * | 4/2003 | Curry et al. | 370/352 |
| 6,584,094 B2 * | 6/2003 | Maroulis et al. | 370/352 |
| 6,594,258 B1 * | 7/2003 | Larson et al. | 370/353 |
| 6,693,894 B1 * | 2/2004 | Andersson et al. | 370/352 |
| 6,718,030 B1 * | 4/2004 | Turner et al. | 379/221.02 |
| 6,856,612 B1 * | 2/2005 | Bjelland et al. | 370/338 |
| 6,888,803 B1 * | 5/2005 | Gentry et al. | 370/259 |
| 6,982,985 B1 * | 1/2006 | Bohacek et al. | 370/410 |
| 7,260,203 B2 * | 8/2007 | Holt et al. | 379/211.02 |
| 2002/0058507 A1 * | 5/2002 | Valentine et al. | 455/433 |
| 2002/0075846 A1 * | 6/2002 | Valentine et al. | 370/352 |

* cited by examiner

*Primary Examiner* — Brian Roberts

(57) ABSTRACT

A communication system includes a switching network and a wireless network. The switching network includes a first gateway for receiving a communication from a caller, a second gateway for establishing an external connection through which the communication can be routed, and a command center that allows the first and second gateways to make an internal connection. The wireless network includes a visited mobile switch center and a home location register. The visited mobile switch center generates routing information, receives the communication from the external connection of the switching network, and routes the communication to a wireless network subscriber. The home location register locates the visited mobile switch center, and passes the routing information from the visited mobile switch center to the command center of the switching network. The command center causes the external connection to be established based on the routing information.

24 Claims, 4 Drawing Sheets

INTERACTION OF VOIP CALLS AND CELLULAR NETWORKS

CROSS-REFERENCE TO RELATED APPLICATIONS

The present application is a continuation of U.S. application Ser. No. 09/653,680 filed on Sep. 1, 2000, entitled "Interaction of VoIP Calls and Cellular Networks," now U.S. Pat. No. 6,982,985, which claims the benefit of U.S. Provisional Application No. 60/152,039 filed on Sep. 2, 1999 and entitled "Interaction of VoIP Calls and Cellular Networks", each of which is hereby incorporated herein by reference in its entirety. The present application incorporates herein by reference in its entirety U.S. Pat. No. 6,167,060 filed on Aug. 8, 1997 and entitled "Dynamic Forward Error Correction Algorithm for Internet Telephone".

BACKGROUND OF THE INVENTION

1. Field of the Invention

This invention relates generally to telephone communications, and more particularly to telephoning via Voice-over-IP (VoIP) and wireless networks.

2. Description of the Background Art

FIG. 1 shows a prior art telephony system 100 that includes a corporate network 120, a traditional Public Switched Telephone Network (PSTN) 140, and a wireless network 160. System 100 routes a communication 124 from a Caller 122 in corporate network 120 to a wireless network Subscriber 190.

The corporate network 120 includes a traditional Private Branch Exchange (PBX) 128. The PSTN 140 includes a Local Exchange Carrier (LEC) 144, which in turn includes a Central Office (CO) 148. PBX 128, which receives communication 124 from Caller 122, establishes connection 130 to Central Office (CO) 148, which in turn establishes connection 150 to wireless network 160. Those skilled in the art will recognize that, instead of communication 124, a comparable communication may also be initiated by a direct telephone call from a home telephone (not shown). Passing through PBX 128, in addition, PSTN 140 may be replaced by an Integrated Services Digital Network (ISDN).

Wireless network 160 includes a Gateway Mobile Switching Center (GMSC) 164, a Home Location Register (HLR) 166, and a Visited Mobile Switching Center (VMSC) 168. GMSC 164, communicating via connection 171 with a base station (BS) 165 within Subscriber 190's "home" wireless network 160, is the control element for managing wireless network 160, and is responsible for switching cellular cells, providing for backup, interfacing with telephone networks, and monitoring telephony traffic.

A wireless Subscriber 190 may "register" merely by turning on his or her cell-phone. This example assumes that Subscriber 190 is currently registered and is not currently engaged in a call. Upon establishment of connection 150 from CO 148, GMSC 164 via signal path 170 gathers information from HLR 166 to determine how to route connection 150. Note that establishment of connection 150 may involve one or more intermediate exchanges.

Wireless network 160 uses HLR 166 and VMSC 168 to locate Subscriber 190 and thereby establish final wireless connection 180. Each Subscriber belongs to one HLR 166 associated with a cellular operator or a commercial network provider. HLR 166 stores information (accounting, subscribed services, profile information, etc.) about Subscriber 190. HLR 166, via one of several (not shown) VMSCs (i.e. VMSC 168), which report back on signal path 174, keeps track of the location of Subscriber 190. VMSC 168 informs HLR 166 when Subscriber 190 is on the system of VMSC 168, and HLR 166 in turn updates its profile record for the new location of Subscriber 190. When a call is placed to Subscriber 190, HLR 166 determines whether Subscriber 190 is a valid subscriber, and if so, which VMSC 168 is currently serving Subscriber 190. Subsequently HLR 166, via signal path 172, requests routing instructions from VMSC 168 for Subscriber 190. VMSC 168, having received information about Subscriber 190 from HLR 166, assigns a routing number N for connection 150, and then returns this routing number N via signal path 174 to HLR 166. The HLR 166 then returns the routing number N via signal path 176 to GMSC 164. The GMSC 164 uses this routing number N to establish connection 178 to VMSC 168. This step may involve one or more intermediate exchanges and/or networks. Once connection 178 is established with the VMSC 168, wireless connection 180 is completed to Subscriber 190 using standard wireless call processing which is not described herein.

FIG. 2 shows a prior art system 200 comprising a corporate network 120 as in system 100 of FIG. 1, a VoIP Virtual Private Network (VPN) 240, and a wireless network 160 as in system 100 of FIG. 1. System 200 uses VPN 240 instead of PSTN 140 of system 100 to route a communication 124 from a Caller 122 to a wireless network Subscriber 190. Connection 130 is established between PBX 128 and GW-1 242, residing within the VoIP VPN 240.

VoIP VPN 240 includes a Command Center (CC) 244, a Gateway (GW-1) 242, and a second Gateway (GW-2) 246. In the preferred embodiment of the invention, CC 244, GW-1 242, and GW-2 246 are command center and gateway products of Clarent Corporation of Redwood City, Calif. In system 200, as in system 100, instead of communication 124 passing through PBX 128, a comparable communication may also be initiated by a direct telephone call from a home telephone.

The gateways GW-1 242 and GW-2 246 support an Internet Protocol (IP) such as Transmission Control Protocol (TCP) or User Datagram Protocol (UDP) connection via the VoIP VPN 240 to the Internet (not shown). GW-1 242 and GW-2 246 support both telephone-to-telephone communications and PC-to-telephone communications.

The originating exchange PBX 128 within the corporate network 120 (or possibly a Central Office, not shown) determines that VPN 240 is on-net. GW-1 242 via signal path 250 requests routing information from CC 244. CC 244 verifies that connection 130 is allowed and translates the called Subscriber 190's number into an IP address. CC 244 via signal path 252 notifies GW-2 246 about the incoming connection 258, and GW-2 246 via signal path 254 notifies CC 244 of its readiness to accept connection 258. CC 244 via signal path 256 returns the translated IP address to GW-1 242. GW-1 242 establishes connection 258 with GW-2 246. GW-2 246 continues routing based upon the called Subscriber 190's number via path 262 to a GMSC 164 within the called Subscriber 190's home wireless network 160. This step may involve one or more intermediate exchanges and/or networks.

From this point on, standard wireless call processing is used. The GMSC 164 via signal path 170 queries HLR 166 containing the Subscriber 190's profile to determine how to continue routing. This example assumes that the subscriber is registered and is not currently engaged in a call. Registration may occur merely by Subscriber 190 turning on his cell-phone. The HLR 166 determines that the Subscriber 190 is valid and determines which VMSC 168 is currently serving him or her. HLR 166 via signal path 172 queries VMSC 168 for routing instructions. The VMSC 168 determines that Subscriber 190 is registered within its service area and assigns a temporary routing number N. VMSC 168 returns this temporary routing number N via signal path 174 to HLR 166, which in turn returns temporary routing number N via signal path 176 to GMSC 164. The GMSC 164 uses the temporary routing number N to route connection 178 to VMSC 168. This step may involve one or more intermediate exchanges and/or networks. Once the connection is established with VMSC 168, wireless call 180 is completed to Subscriber 190 using standard wireless call processing, which is not described herein.

In both prior art systems 100 and 200, GMSC 164 is fixed in the home service area of Subscriber 190. System 200 changes between using VMSCs 168 in different locations based upon the location of Subscriber 190, and regardless of the subscriber's location, connections are always routed to GMSC 164 before being transmitted to the VMSC 168 closest to the subscriber, generally, and then to Subscriber 190. The GMSC 164 being fixed in the home service area for Subscriber 190 creates inefficiency. For example, suppose Subscriber 190 has a home base in Los Angeles (LA), Calif., and travels to San Francisco (SF), Calif., where Caller 122 resides. Consequently, GMSC 164 is in LA (or some nearby locality) and VMSC 168 is in SF (or some nearby locality). As Caller 122 uses either system 100 or 200 to call Subscriber 190, routing must go from SF to GMSC 164 in LA, then to VMSC 168 in SF, and eventually to Subscriber 190 in SF. As a result, even if Caller 122 and Subscriber 190 are in the same locale of SF, routing must first go through LA before reaching Subscriber 190, who is in SF. Further, in a traditional wireless call as depicted in system 100, Caller 122 would incur two long distance toll charges, one from SF to LA, and one from LA back to SF.

Additionally, VoIP VPN 240 of system 200 loses control of routing. As connection 262 leaves GW-2 246 and enters wireless network 160, the wireless network 160 assumes complete control of routing. Once the connection 262 is passed from VoIP VPN 240 into the wireless network 160, a traditional toll call takes place, even though Caller 124 and Subscriber 190 in this example are both located in SF. The VoIP VPN 240 eliminates the toll leg from SF to LA, but the wireless network 160 still creates a toll call from GMSC 164 in LA to VMSC 168 in SF.

Moreover, in various situations, VoIP VPN 240 would benefit from maintaining control of a call up to the connection 262 with VMSC 168 for providing additional call completion services without being dependent upon wireless network 160.

What is needed, therefore, is a solution that can alleviate the above-discussed deficiencies by eliminating possible and/or unnecessary toll calls.

SUMMARY OF THE INVENTION

The present invention provides a system and method for improving current telephony use of VoIP on a VPN to interact with a wireless network. The invention efficiently routes telephone calls to wireless subscribers and allows a VoIP VPN system to gain and maintain control of a call. The invention thereby extends capabilities of VoIP VPN services to permit intelligent call completion even after a call has been routed to a terminating wireless network or in the event that a wireless network subscriber cannot be reached. The invention also eliminates toll calls associated with traditional wireless calls and prior art VoIP VPN wireless calls.

In accordance with the invention, if a called party does not answer a call then the calling party can control disposition of the call. Using the profile of the called party, the invention may provide the following services/capabilities: a caller may route a call to the called party's secretary, voice mail, pager or alternate destination; the system may automatically route the call to the most likely location of the called party; the system, based upon the identity of the calling party, may route the call to a specific location; and, when a call is established, the called party may control further capabilities, such as transferring the call or adding a third party, among other options.

DETAILED DESCRIPTION OF THE PREFERRED EMBODIMENT

Figure 1:
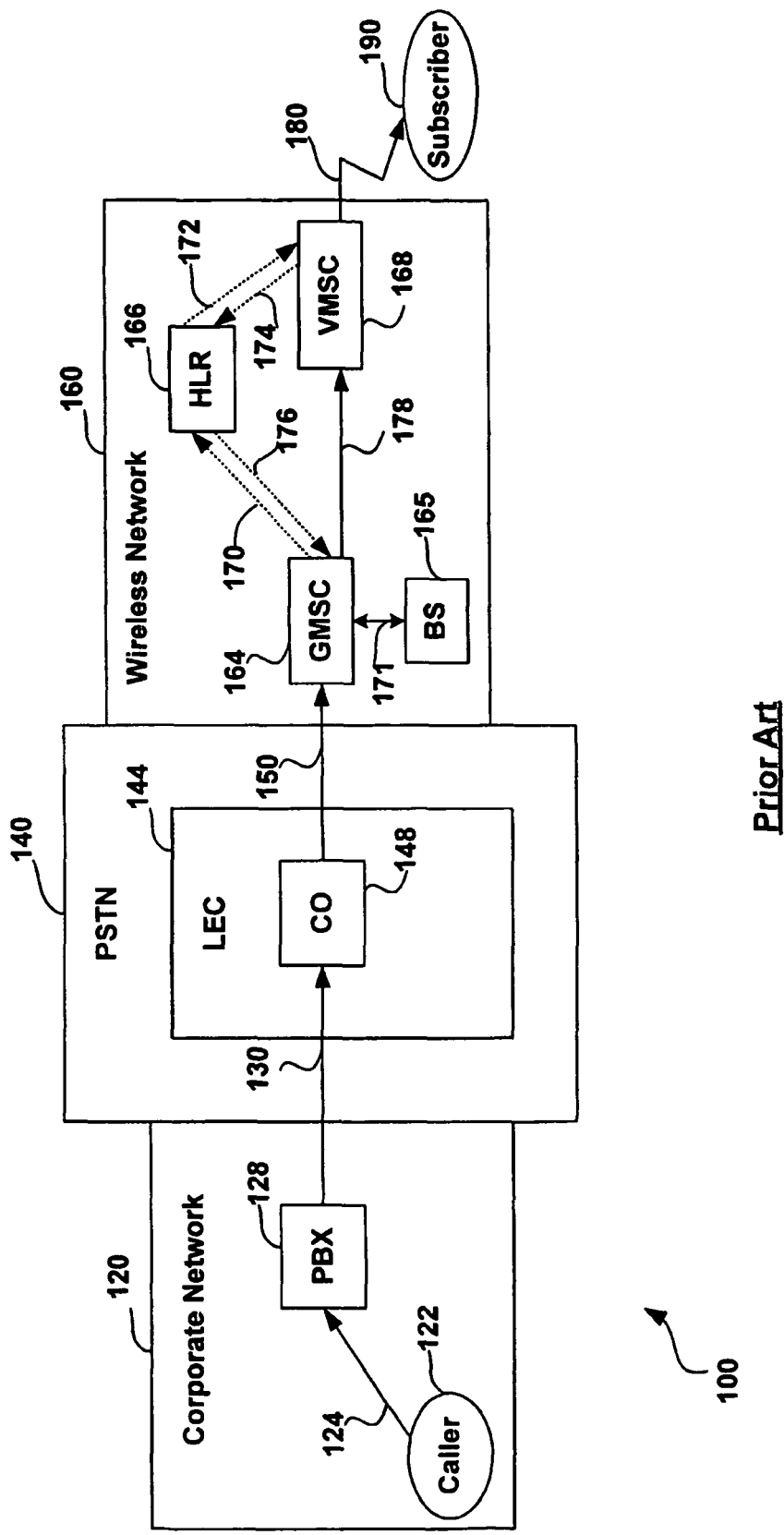
FIG. 1 is a block diagram showing a prior art system for a traditional wireless telephone call.
Figure 2:
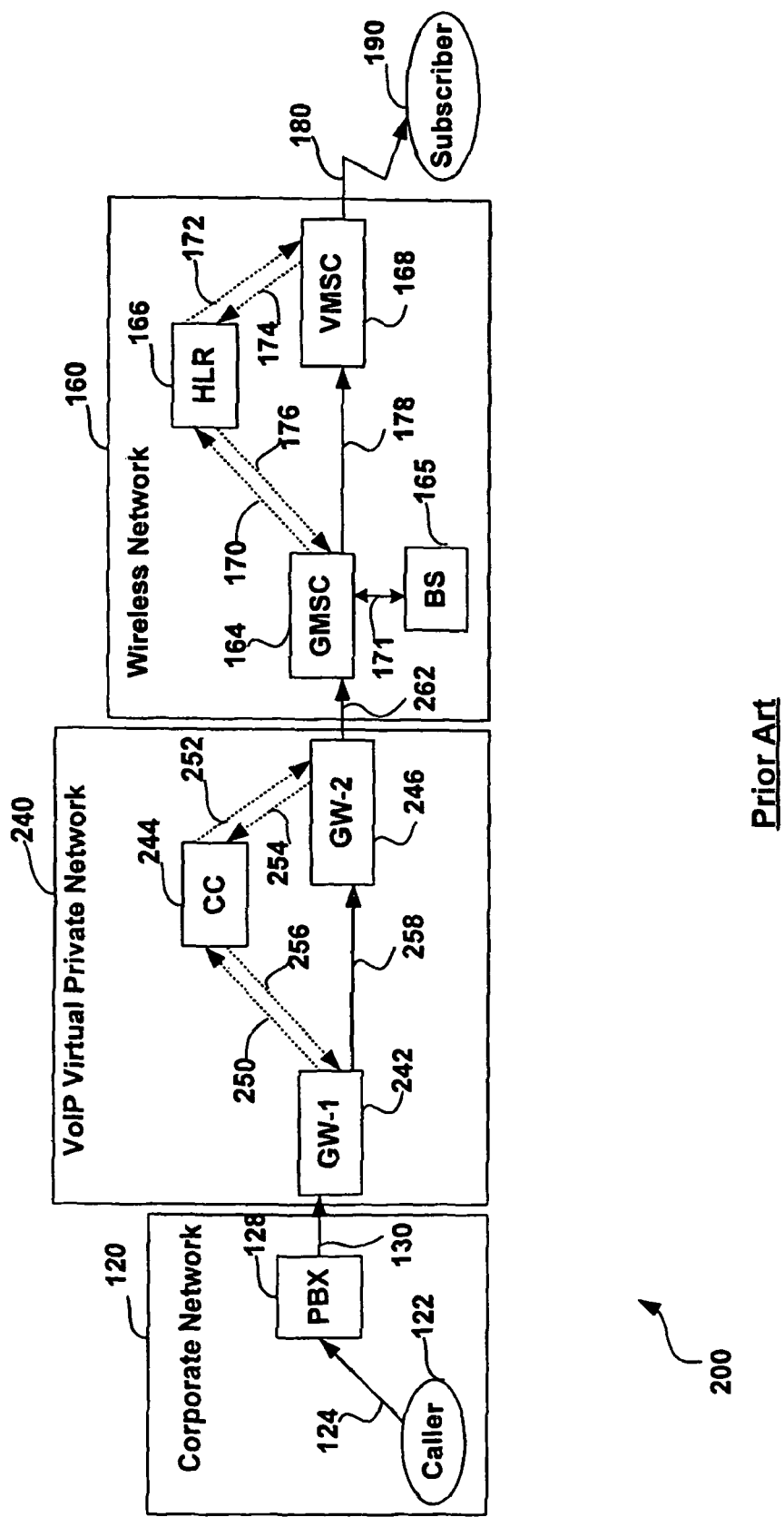
FIG. 2 is a block diagram showing a prior art system for wireless telephone calling using a VoIP Virtual Private Network.
Figure 3:
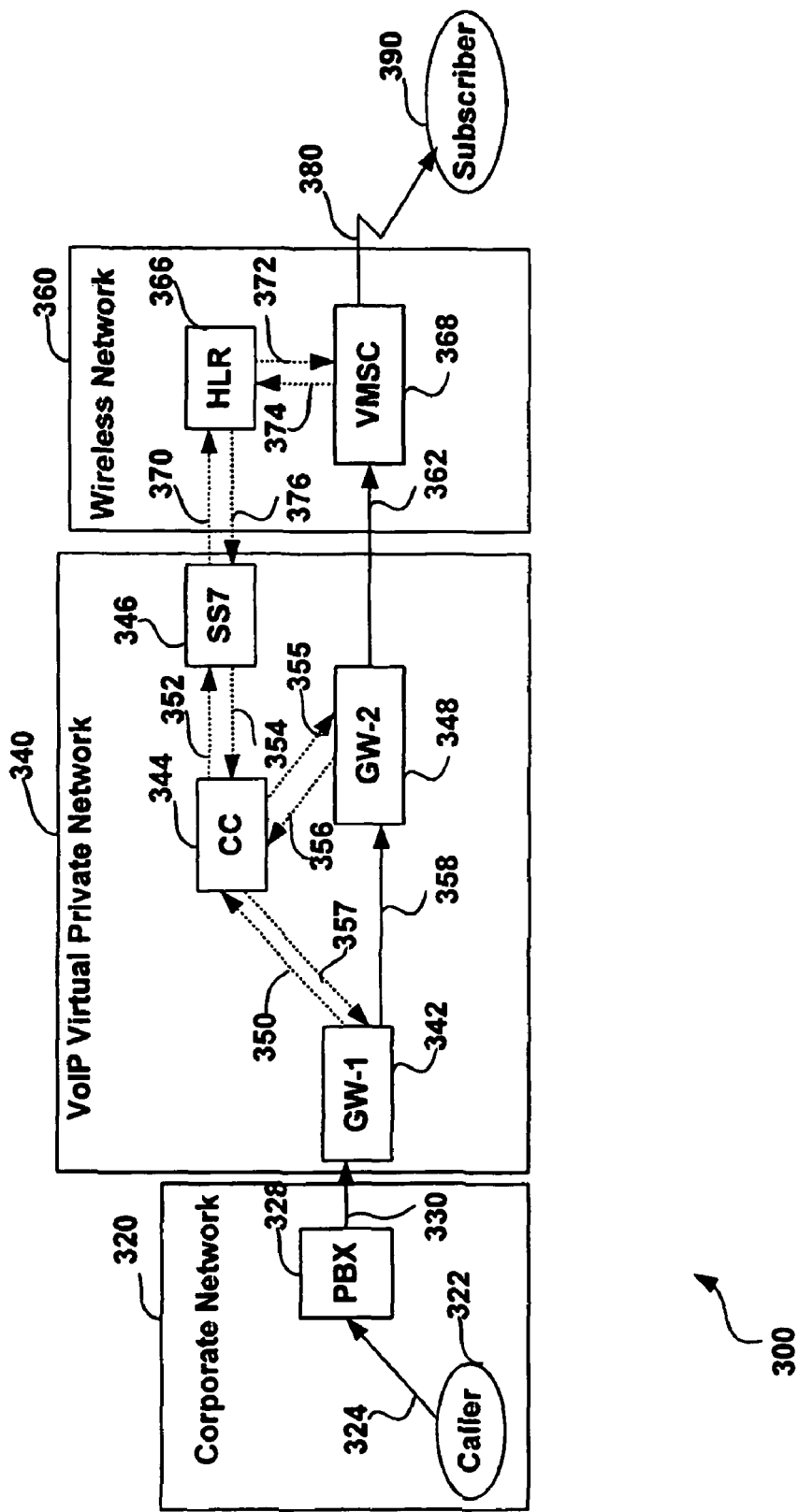
FIG. 3 is a block diagram showing an improved system for wireless telephone calling using a VoIP Virtual Private Network in accordance with the invention.

FIG. 3 shows a system 300 comprising corporate network 320, VoIP VPN 340, and wireless network 360. In this scenario, corporate network 320 remains the same as network 120 of FIG. 1 and of FIG. 2. However, element numbers are modified for FIG. 3 to aid in distinguishing elements related to the present invention. The VoIP VPN 340 product replaces the PSTN 140 of FIG. 1 and the VoIP VPN 240 of FIG. 2, and wireless network 360 replaces the wireless network 160 of FIG. 1 and of FIG. 2. In accordance with the invention, system 300 uses VoIP VPN 340 to route a communication 324, initiated by a Caller 322 from PBX 328 in corporate network 320, to a wireless network Subscriber 390. Those skilled in the art will recognize that communication 324 may also be initiated by a direct telephone call from a home telephone via a telephone company provider or a local central office rather than PBX 328.

VoIP VPN 340 includes a CC 344, GW-1 342, GW-2 348, and a Signaling System Seven (SS7) backbone 346. CC 344 includes additional functionality over CC 244 of FIG. 2. The CC 344 is where most of the changes for routing occur. The CC 344 determines routing steps and instructs GW-1 342 and GW-2 348 how to communicate with each other. The originating exchange (PBX 328 or a CO such as CO 148 of FIG. 1) within the corporate network 320 may use an ISDN Primary Rate Q.931 protocol to establish a connection 330 to GW-1 342.

Wireless network 360 includes an HLR 366 and a VMSC 368. HLR 366, as compared to HLR 166 of FIG. 1, may receive instructions from CC 344, which was prohibited in prior art systems. Wireless network 360 does not include a GMSC 164 as in wireless network 160 because the function of GMSC 164 has been incorporated into VoIP VPN 340. VMSC 368, as compared to VMSC 168 of FIG. 1, receives connections 362 from GW-2 348 instead of from the GMSC 164 of system 100. Therefore, this scenario is advantageous over prior systems because, in accordance with the invention, routing does not have to go through a GMSC 164, which is normally fixed at a home base of the Subscriber 390. Further, VoIP VPN 340 maintains control of connections 330, 358, and 362, and can thereby extend additional capabilities. Routing steps associated with system 300 is discussed below with respect to FIG. 4.

Figure 4:
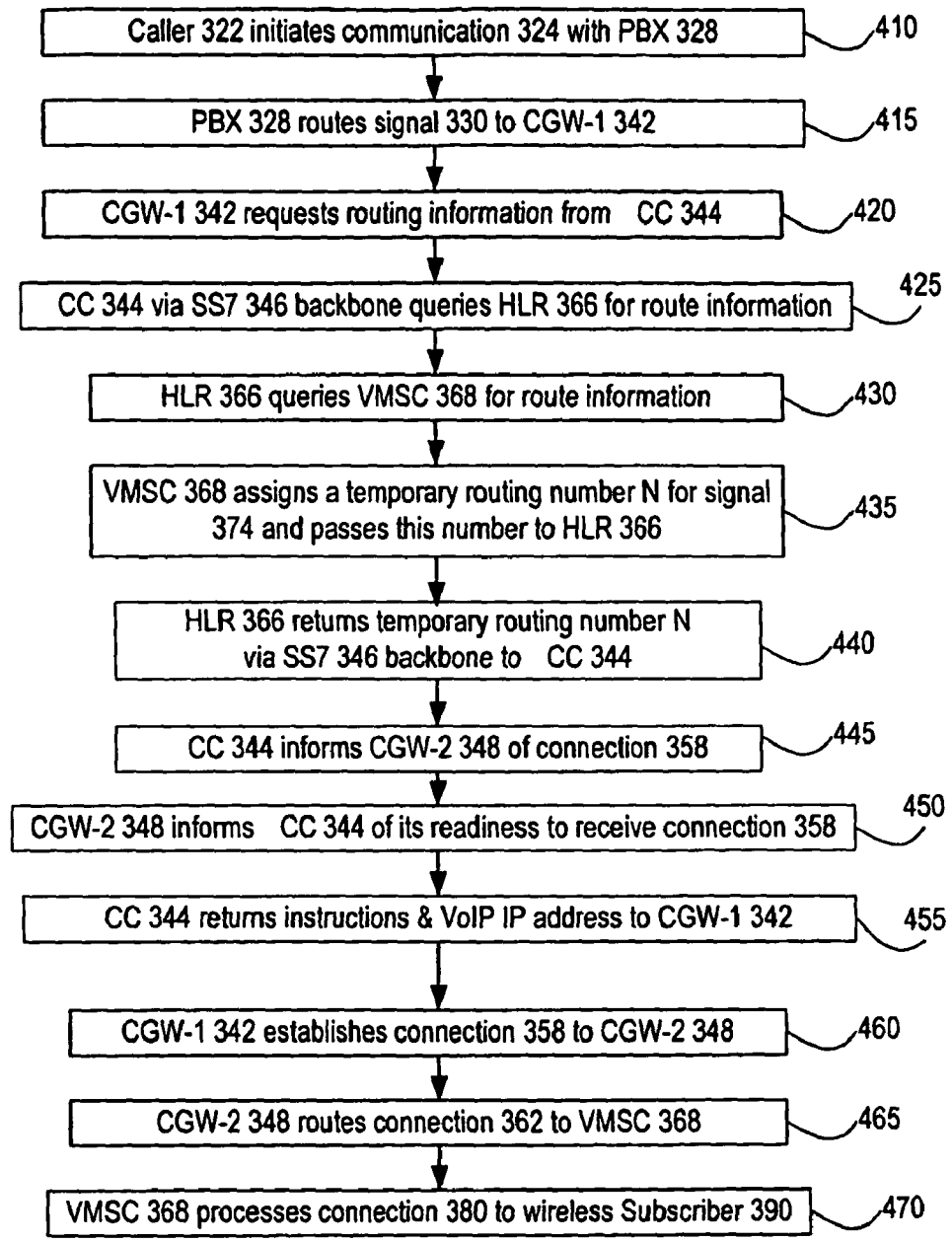
FIG. 4 is a flowchart illustrating steps in a method for routing a call in accordance with the invention.

FIG. 4 is a flowchart illustrating the steps of a method 400 that corresponds to the routing steps of FIG. 3. In step 410, Caller 322 initiates a communication 324 with PBX 328 in corporate network 320. In step 415, the originating exchange within the corporate network 320 (PBX 328, or CO 148 as in FIG. 1) determines that communication 324 is an on-net VoIP VPN 340 communication, and thus, routes via connection 330 to GW-1 342. In step 420, GW-1 342 via signal path 350 requests routing information from CC 344.

In step 425, new functionality in CC 344 determines whether the called telephone number of Subscriber 390 is a valid subscribed wireless number, and if so, CC 344 determines the characteristics of the home network (e.g., Electronics Industries Association EIA-41 standard or Global System for Mobile (GSM) communications standard) for the Subscriber 390. This functionality provides enhanced VPN call processing. CC 344, via signal path 352, uses SS7 gateway (backbone) 346, which via signal path 370 queries HLR 366 for routing information.

In step 430, HLR 366 determines whether Subscriber 390 is a valid subscriber, and, if so, queries the serving VMSC 368 for routing information via signal path 372. This is standard wireless routing interrogation. In accordance with the invention, the query to the HLR 366 appears as if it were from a GMSC (such as GMSC 164 of system 100), although the query is instead from CC 344. Policing table(s) in HLR 366 may need to be updated to allow CC 344 to perform the interrogation since most wireless networks restrict this capability to GMSCs within their own network. The invention is thus advantageous over prior art techniques because the invention does not need to use GMSC 164, which is always at the home base of the called subscriber.

In step 435, VMSC 368 determines whether Subscriber 390 is registered, and if so, VMSC 368 assigns a temporary routing number N and passes this number N on signal path 374 to HLR 366. In step 440, HLR 366 returns temporary routing number N via signal path 376 through SS7 346, and then via signal path 354, to CC 344 (which HLR 366 interacts with as if it were a GMSC). In prior art, such as in system 100, HLR 166 returns a temporary routing number N to GMSC 164 instead of to a CC such as CC 344 of system 300.

In step 445, new functionality in CC 344, based on temporary routing number N, determines the capabilities of the terminating mobile wireless network 360. Existing functionality of CC 344 also determines the identity of GW-2 348 that serves the temporary routing number N and, via signal path 355, informs GW-2 348 of the incoming connection 358. In step 450, GW-2 348 via signal path 356 informs CC 344 that GW-2 348 is ready to receive connection 358, and in step 455, CC 344 via signal path 357 returns instructions and a VoIP IP address to GW-1 342. The instructions are extended to include an indication that routing is to a mobile Subscriber 390 as well as to include the capabilities of the terminating mobile wireless network 360. Steps 445, 450, and 455 comprise additional enhancements for VoIP VPN call processing. Since all the long distance service is provided through the VoIP VPN 340, local connections 330 and 362 are the only traditional telecom or telephony links used.

In step 460, GW-1 342 establishes connection 358 to GW-2 348. In step 465, GW-2 348 uses temporary routing number N to route connection 362 to VMSC 368. In accordance with the invention, step 465 may involve one or more intermediate exchanges and/or networks. In step 470, VMSC 368 uses standard wireless call processing to complete wireless connection 380 to Subscriber 390.

In accordance with the invention, method 400 is advantageous over prior art techniques as method 400 efficiently and directly routes to where Subscriber 390 is located, rather than first through a home location for Subscriber 390 and then to Subscriber 390, thereby incurring toll call charges. The invention also provides intelligent call completion services if Subscriber 390 is not reachable (e.g., if the phone line is busy or if Subscriber 390's phone is turned off or out of the wireless service area). These services are also applicable to calls terminating to fixed subscribers.

While the invention has been described herein with reference to certain exemplary embodiments, these embodiments are provided for illustrative purposes only and are not intended to be limiting. Therefore, those skilled in the art will recognize that other embodiments can be practiced without departing from the scope and spirit of the claims set forth below.

What is claimed is:

1. A switching network for routing a caller's communication to a wireless subscriber through a wireless network, comprising:
   a first gateway for receiving the communication;
   a command center for receiving routing information from the wireless network and for determining a capability of the wireless network based on a routing number included in the routing information; and
   a second gateway for receiving the communication from the first gateway based on the routing information and for making an external connection to a switching center of the wireless network based on the routing information,
   wherein the switching center of the wireless network further routes the communication to the wireless subscriber.

2. The switching network of claim 1 further comprising an SS7 gateway through which the command center receives the routing information from the wireless network.

3. The switching network of claim 1 wherein the command center is configured to determine whether the communication should be routed through the wireless network.

4. The switching network of claim 1 wherein the command center is configured to determine characteristics of the wireless network.

5. The switching network of claim 1 wherein
   the first gateway is configured to request routing information from the command center upon receiving the communication from the caller, and
   the command center is configured to send a query to the wireless network upon receiving the request from the first gateway.

6. The switching network of claim 1 wherein the switching network is a voice over Internet protocol (VoIP) Network.

7. A voice over Internet protocol (VoIP) switching network for routing a communication from a caller through a wireless network to a subscriber thereof, the switching network comprising:
   a first gateway configured to establish an external connection through which the communication can be routed directly to a visited mobile switching center of the wireless network, the visited mobile switching center serving the subscriber;
   a command center configured to: receive routing information from the wireless network; determine a capability of the wireless network based on a temporary routing number included in the routing information; and cause the first gateway to make the external connection according to the routing information;
   a second gateway configured to: receive the communication into the switching network; send a request to the command center for the routing information; and route the communication to the first gateway according to the routing information, wherein the command center is further configured to inform the first gateway of an incoming connection from the second gateway.

8. The switching network of claim 7 wherein the command center is further configured to determine whether a telephone number associated with the subscriber is a valid subscribed wireless number.

9. The switching network of claim 7, wherein the command center is further configured to return instructions and an IP address to the second gateway.

10. A method of routing a communication to a wireless subscriber, the method comprising:
at a voice over Internet protocol (VoIP) network:
receiving the communication;
requesting routing information from a wireless network;
receiving the routing information from the wireless network;
determining a capability of the wireless network based on a routing number included in the routing information;
routing the communication to a gateway of the VoIP network in proximity to the wireless subscriber; and
establishing an external connection through which the communication can be routed to a switching center of the wireless network based on the routing information; and
at the wireless network:
generating the routing information in response to the request from the VoIP network;
passing the routing information to the VoIP network;
receiving the communication from the VoIP network through the external connection in a switching center of the wireless network; and
routing the communication from the switching center to the wireless subscriber.

11. The method of claim 10 further comprising determining whether the communication should be routed through the wireless network at the VoIP network.

12. The method of claim 11 further comprising determining characteristics of the wireless network at the VoIP network.

13. A method of routing a communication to a wireless network, the method comprising:
receiving the communication in a voice over Internet protocol (VoIP) network;
requesting routing information from the wireless network;
receiving the routing information from the wireless network;
determining a capability of the wireless network based on a routing number included in the routing information;
routing the communication to a gateway of the VoIP network in proximity to a wireless subscriber based on the routing information;
establishing an external connection from the VoIP network to a switching center of the wireless network based on the routing information; and
routing the communication to the switching center of the wireless network through the external connection,
wherein the switching center of the wireless network further routes the communication to the wireless subscriber.

14. The method of claim 13 further comprising determining characteristics of the wireless network.

15. A method for routing a communication, the method comprising:
in a voice over Internet protocol (VoIP) virtual private network:
receiving a communication at a first node of the virtual private network destined for a subscriber of an external telephone network;
requesting routing information associated with the subscriber from a register associated with the external telephone network;
receiving the routing information from the register;
determining a capability of the external telephone network based on a routing number included in the routing information;
routing the communication to a second node of the virtual private network located in proximity to an access point of the external telephone network based on the routing information; and
routing the communication from the second node of the virtual private network to the access point of the external telephone network,
wherein the access point of the external telephone network further routes the communication to the subscriber,
wherein the external telephone network is not part of the virtual private network.

16. The method of claim 15, wherein the external telephone network is a wireless telephone network.

17. The method of claim 16, wherein the communication is routed at the VoIP network to one of a plurality of destinations associated with the subscriber.

18. The method of claim 17, wherein the destination is determined based on an identity associated with a calling party associated with the communication.

19. The method of claim 17, wherein a calling party associated with the communication selects the destination.

20. The method of claim 17, wherein the communication is routed at the VoIP network to a first destination in response to a second destination not being reachable.

21. The method of claim 15, wherein the communication is routed at the VoIP network to one of a plurality of destinations associated with the subscriber.

22. The method of claim 21, wherein the destination is determined based on an identity associated with a calling party associated with the communication.

23. The method of claim 21, wherein a calling party associated with the communication selects the destination.

24. The method of claim 21, wherein the communication is routed at the VoIP network to a first destination in response to a second destination not being reachable.

* * * * *